US009919682B2

(12) United States Patent
Flick

(10) Patent No.: US 9,919,682 B2
(45) Date of Patent: *Mar. 20, 2018

(54) REMOTE FUNCTION DEVICE AND ASSOCIATED WIRELESS SECURITY SENSOR FOR A VEHICLE HAVING A DATA COMMUNICATIONS BUS AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,267

(22) Filed: Jan. 12, 2016

(65) Prior Publication Data

US 2017/0197588 A1    Jul. 13, 2017

(51) Int. Cl.
*B60R 25/30* (2013.01)
*B60R 25/10* (2013.01)
(Continued)

(52) U.S. Cl.
CPC .............. *B60R 25/30* (2013.01); *B60R 25/00* (2013.01); *B60R 25/10* (2013.01); *B60R 25/102* (2013.01);
(Continued)

(58) Field of Classification Search
CPC ......... B60R 25/30; B60R 25/10; B60R 25/00; B60R 25/102; B60R 16/023;
(Continued)

(56) References Cited

U.S. PATENT DOCUMENTS 4,055,772 A    10/1977   Leung
4,383,242 A    5/1983   Sassover et al.
(Continued)

FOREIGN PATENT DOCUMENTS

CA     2951679     7/2017

OTHER PUBLICATIONS

EIC 3600 Search Report.*
(Continued)

*Primary Examiner* — Rami Khatib
*Assistant Examiner* — Jeffrey Boomer
(74) *Attorney, Agent, or Firm* — Allen, Dyer, Doppelt + Gilchrist, P.A. Attorneys at Law

(57) ABSTRACT

A remote function control system is for a vehicle including a data communications bus extending throughout the vehicle and coupled to a plurality of vehicle devices, and a wired vehicle electrical power system. The system may include a remote function device coupled to the data communications bus and including an interior wireless device to wirelessly communicate within the vehicle, an exterior wireless device to wirelessly communicate with a remote control device away from the vehicle, and a controller coupled to the interior and exterior wireless devices to permit communication between the remote control device and at least one vehicle device coupled to the vehicle data communications bus. The system may further include a wireless security sensor positioned within the vehicle and coupled to the wired vehicle electrical power system, with the wireless security sensor being configured to wirelessly communicate within the vehicle to the interior wireless device.

27 Claims, 6 Drawing Sheets

(51) Int. Cl.
*B60R 25/00* (2013.01)
*B60R 25/102* (2013.01)
*B60R 16/023* (2006.01)
*G06F 13/42* (2006.01)

(52) U.S. Cl.
CPC ........ *G06F 13/42* (2013.01); *B60R 2325/205* (2013.01)

(58) Field of Classification Search
CPC ............. B60K 2350/928; B60K 35/00; B60W 2050/146; B60W 30/10; B60W 30/12; B60W 50/14; B62D 15/025; B62D 15/0255; B62D 15/029
See application file for complete search history.

(56) References Cited

U.S. PATENT DOCUMENTS

| | | | |
|---|---|---|---|
| 4,538,262 A | 8/1985 | Sinniger et al. | |
| 4,697,092 A | 9/1987 | Roggendorf | |
| 4,760,275 A | 7/1988 | Sato | |
| 4,792,783 A | 12/1988 | Burgess | |
| 5,146,215 A | 9/1992 | Drori | |
| 5,252,966 A | 10/1993 | Lambropoulos et al. | |
| 5,719,551 A | 2/1998 | Flick | |
| 6,011,460 A | 1/2000 | Flick | |
| 6,676,615 B2* | 1/2004 | Flick | A61H 23/0263 601/148 |
| 6,734,790 B1* | 5/2004 | Hodger | B60R 25/102 307/10.2 |
| 6,771,167 B1* | 8/2004 | Flick | B60R 16/03 307/10.2 |
| 6,801,119 B1* | 10/2004 | Flick | B60R 25/1004 340/426.1 |
| 7,010,402 B2 | 3/2006 | Flick | |
| 8,032,278 B2 | 10/2011 | Flick | |
| 8,362,886 B2 | 1/2013 | Flick | |
| 9,656,631 B1 | 5/2017 | Flick | |
| 2003/0018429 A1* | 1/2003 | Flick | B60R 25/04 701/484 |
| 2004/0049325 A1* | 3/2004 | Flick | B60R 25/2009 701/2 |
| 2005/0046545 A1 | 3/2005 | Skekloff et al. | |
| 2006/0129284 A1* | 6/2006 | Flick | B60R 25/00 701/2 |
| 2007/0279283 A1* | 12/2007 | Flick | B60R 25/04 342/357.31 |
| 2009/0079552 A1* | 3/2009 | Flick | B60R 25/209 340/426.17 |
| 2009/0089065 A1* | 4/2009 | Buck | B60R 16/0373 704/275 |
| 2014/0266811 A1* | 9/2014 | Flick | G08G 1/127 340/993 |
| 2014/0274012 A1* | 9/2014 | Flick | H04W 4/046 455/418 |
| 2014/0277838 A1* | 9/2014 | Flick | G06F 7/00 701/2 |
| 2015/0116100 A1* | 4/2015 | Yang | G07C 9/00119 340/426.19 |
| 2015/0246658 A1* | 9/2015 | Flick | B60R 25/24 701/2 |
| 2015/0251633 A1* | 9/2015 | Flick | B60R 25/1004 340/429 |

OTHER PUBLICATIONS

M. Thompson "The Thick and Thin of Car Cabling" by Thompson appearing in the IEEE Spectrum, Feb. 1996, vol. 33, Issue 2, pp. 42-45. Abstract Only.
The Society of Automotive Engineers "Surface Vehicle Standard, Class B Data Communications Network Interface", SAE J1850, Jul. 1995; Abstract Only.
"Surface Vehicle Information Report, Chrysler Sensor and Control (CSC) Bus Multiplexing Network for Class 'A' Applications", SAE J2058, Jul. 1990; Abstract Only.
U.S. Appl. No. 14/993,232, filed Jan. 12, 2016.
U.S. Appl. No. 14/993,297, filed Jan. 12, 2016.

\* cited by examiner

REMOTE FUNCTION DEVICE AND ASSOCIATED WIRELESS SECURITY SENSOR FOR A VEHICLE HAVING A DATA COMMUNICATIONS BUS AND RELATED METHODS

TECHNICAL FIELD

The present invention relates to the field of vehicle control systems and, more particularly, to a remote function control system and related methods for vehicles.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

One approach to addressing these shortcomings is described in U.S. Pat. No. 6,011,460 to Flick which discloses a multi-vehicle security system. More particularly, the Flick '460 patent discloses a desired signal enabling circuit electrically coupled to the data communications bus for enabling an alarm controller to operate using a set of desired signals for a desired vehicle from among a plurality of possible sets of signals for different vehicles. Thus, the desired signal enabling circuit permits the alarm controller to communicate with a vehicle security sensor and an alarm indicator via the data communications bus so that the alarm controller is capable of operating the alarm indicator responsive to the vehicle security sensor. The desired signal enabling circuit may learn the desired set of signals from the plurality of different sets of signals for different vehicles by connection and communications with a downloading device, such as a portable or laptop computer.

However, still further improvements for remote control device operation of vehicle devices, for example, a security system, remote start system, etc., may be desired. In particular, it may desirable to more easily configure or adapt a wider range of vehicle devices to be operated from a remote control device.

SUMMARY

A remote function control system is for a vehicle including a data communications bus extending throughout the vehicle and coupled to a plurality of vehicle devices, and a wired vehicle electrical power system. The system may include a remote function device coupled to the data communications bus and including an interior wireless device to wirelessly communicate within the vehicle, an exterior wireless device to wirelessly communicate with a remote control device away from the vehicle, and a controller coupled to the interior and exterior wireless devices to permit communication between the remote control device and at least one vehicle device coupled to the vehicle data communications bus. The system may further include a wireless security sensor positioned within the vehicle and coupled to the wired vehicle electrical power system, with the wireless security sensor being configured to wirelessly communicate within the vehicle to the interior wireless device.

More particularly, the at least one vehicle device may comprise a vehicle alarm, and the controller may be configured to activate the vehicle alarm responsive to the wireless security sensor. The controller may be further configured to send an alert to the remote control device via the third wireless device responsive to the wireless security sensor. The remote function device may further include a satellite positioning receiver coupled to the controller. Furthermore, the remote function device may also include a portable housing carrying the interior and exterior wireless devices and the controller, and the portable housing may be removably coupled to the data communications bus.

The controller may be configured to send an alert to the remote control device via the exterior wireless device based upon the wireless security sensor. By way of example, the wireless security sensor may comprise at least one of a trunk sensor, door sensor, hood sensor, and a window sensor. Also by way of example, the wireless security sensor may comprise at least one of a vibration sensor, sound sensor, pressure sensor, and a radar sensor.

In accordance with one example, the controller may comprise a multi-vehicle compatible controller operable with a plurality of different vehicles using respective different bus protocols. The multi-vehicle compatible controller may also be operable with a plurality of different vehicles using respective different vehicle device bus codes. In another example, the multi-vehicle compatible controller may be operable with a plurality of different vehicles using respective different wireless communications protocols of the first wireless device. Additionally, the multi-vehicle compatible controller may be operable with a plurality of different vehicles using respective different wireless communications codes of the first wireless device.

The controller may permit communication for the remote control device to read data from the wireless security sensor. Moreover, the controller may permit communication for the remote control device to command the wireless security sensor.

A related method is for remotely controlling a vehicle function in a vehicle including a data communications bus extending throughout the vehicle and coupled to a plurality of vehicle devices, and a wired vehicle electrical power system. The method may include using a remote function device coupled to the data communications bus to wirelessly communicate via an interior wireless device with a wireless security sensor positioned within the vehicle and coupled to the wired vehicle electrical power system, wirelessly communicate via an exterior wireless device with a remote control device away from the vehicle, and permit communication via a controller coupled to the interior and exterior wireless devices between the remote control device and at least one vehicle device coupled to the vehicle data communications bus.

DETAILED DESCRIPTION

This disclosure is provided with reference to the accompanying drawings, in which various example embodiments are shown. However, other embodiments and different forms may be used, and the disclosure should not be construed as limited to the example embodiments set forth herein. Rather, these example embodiments are provided so that this disclosure will be thorough and complete. Like numbers refer to like elements throughout, and prime and multiple prime notation are used to indicate similar elements in alternative embodiments.

Figure 1:
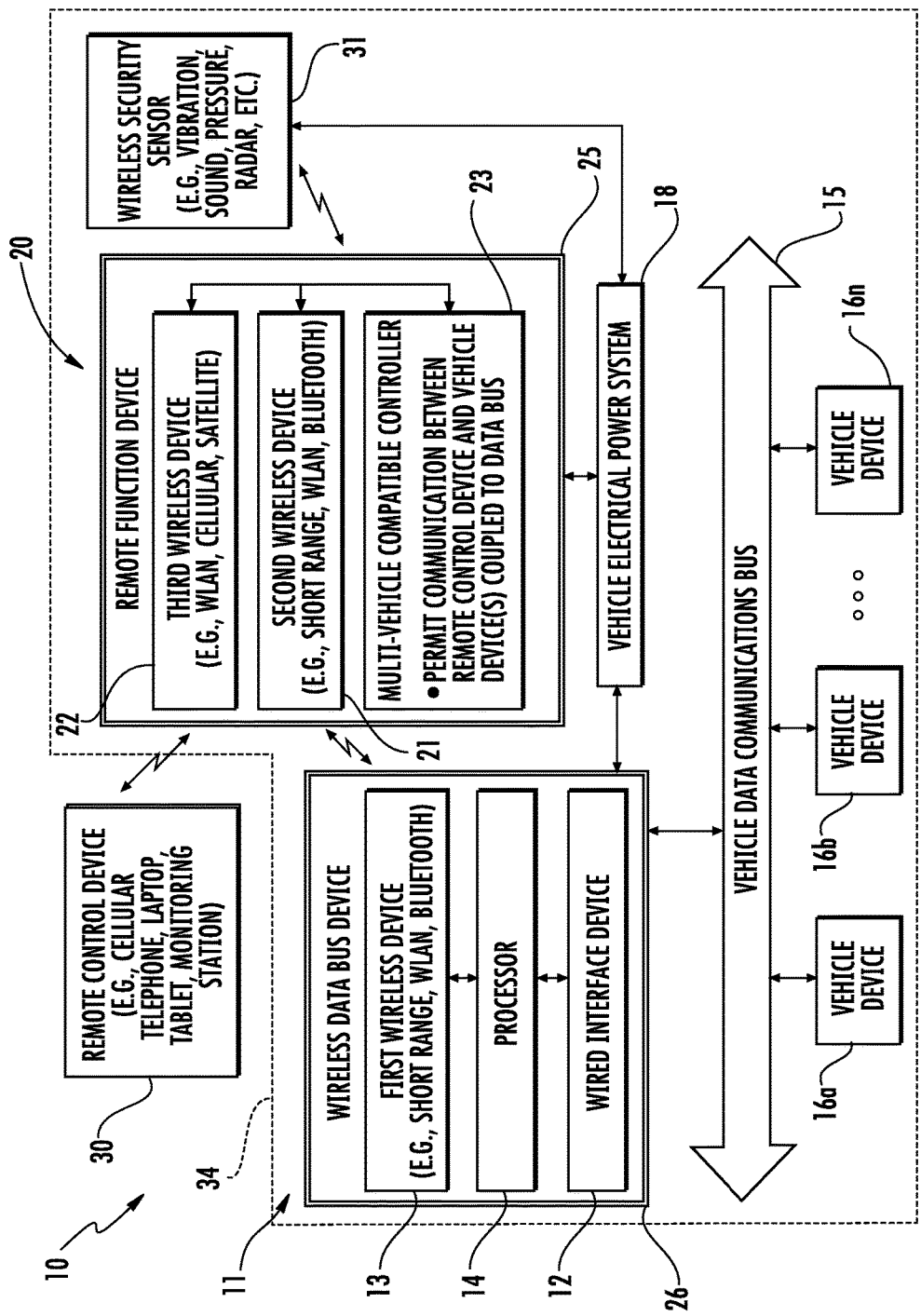
FIG. 1 is a block diagram of a remote function control system in accordance with an example embodiment.
Figure 4:
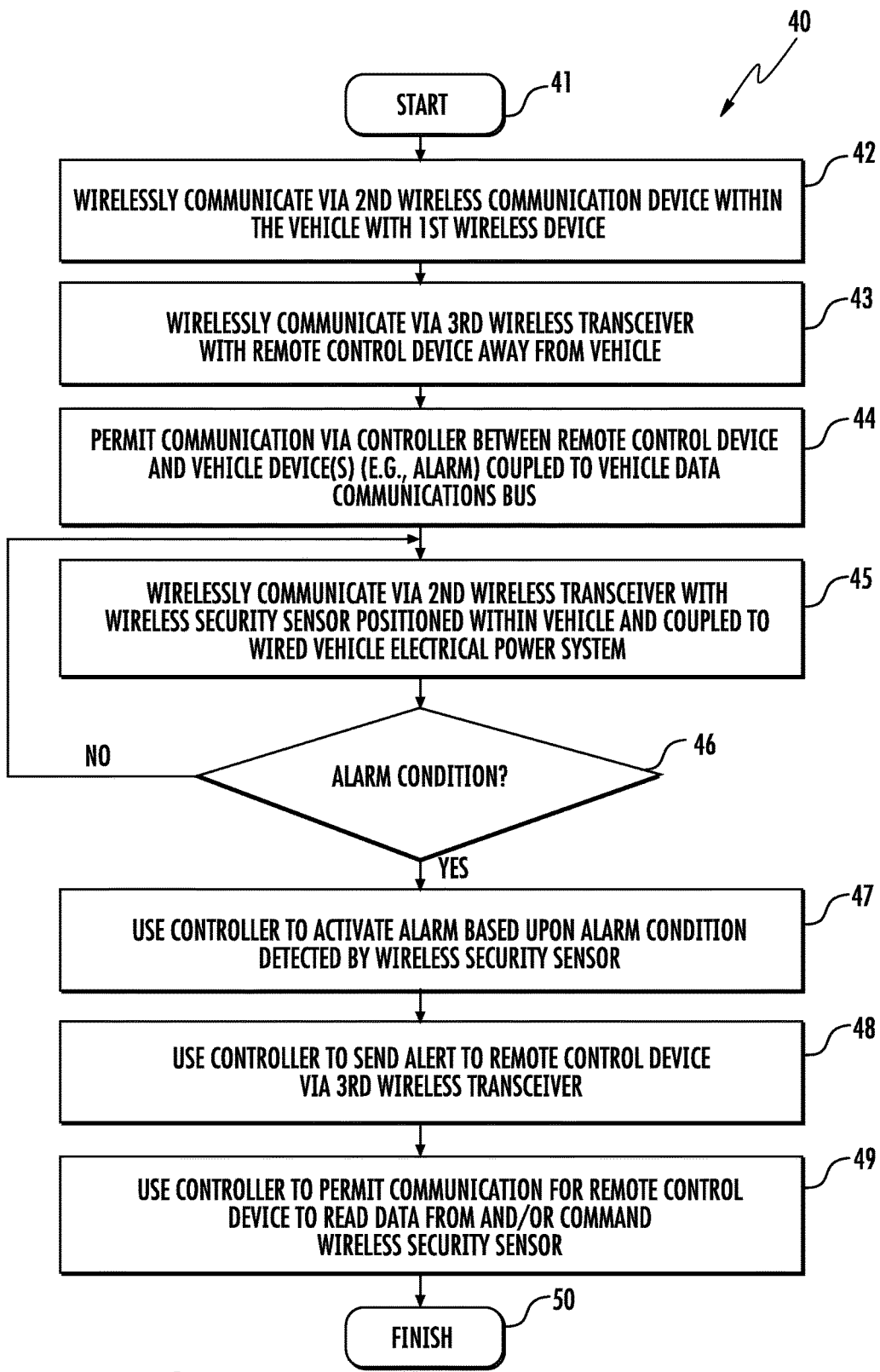
FIG. 4 is a flow diagram illustrating method aspects associated with the system of FIG. 1.

Referring initially to FIG. 1 and the flow diagram 40 of FIG. 4, a remote function control system 10 and associated method aspects for a vehicle 34 including a data communications bus 15 extending throughout the vehicle and connecting a plurality of vehicle devices 16a-16n within the vehicle are first described. By way of example, such vehicle devices 16a-16n may be sensors or controllers as disclosed in U.S. Pat. Nos. 5,719,551 and 6,011,460 to Flick, assigned to the present assignee, and the entire contents of both of which are herein incorporated by reference. The vehicle 34 also illustratively includes a wired vehicle electrical power system 18. The wired vehicle electrical power system 18 may provide power to electronic devices within the vehicle and may include a vehicle battery and/or vehicle alternator, for example, as will be appreciated by those skilled in the art.

The remote function control system 10 illustratively includes a wireless data bus device 11 and a remote function device 20. The wireless interface device 11 is coupled to the vehicle wired electrical power system 18 and includes a wired interface 12 coupled to the data communications bus 15. The wireless data bus device 11 may also include a first wireless device 13 coupled to the wired interface 12 for wirelessly communicating with the remote function device 20. The first wireless device 13 may be a short-range wireless device. For example, the first wireless device 13 may be a Bluetooth transceiver, and/or a wireless local area network (WLAN) transceiver. Of course, the first wireless device 13 may be another type of transceiver and/or may be able to communicate via more than one wireless protocol, for example, either Bluetooth or WLAN.

The wireless data bus device bus device 11 also illustratively includes a processor 14 coupled to the first wireless device 13 and the wired interface 12 for performing the functions described herein. The wireless data bus device 11 illustratively includes a first housing 26. By way of example, the processor 14 may be implemented using a microprocessor and associated non-transitory computer-readable medium having computer-executable instructions for causing the microprocessor to perform the various functions described herein.

The remote function device 20 is also coupled to the wired vehicle electrical power system 18 and illustratively includes a second housing 25. Beginning at Block 41, the remote function device 20 illustratively includes a second wireless device 21 for wirelessly communicating internally within the vehicle 34, e.g., with the first wireless device 13, at Block 42. More particularly, similarly to the first wireless device 13, the second wireless device 21 may also be a short-range wireless device. In this regard, the second wireless device 21 may be considered an "interior" wireless device in that it communicates with other wireless devices within the vehicle 34. For example, the second wireless device may be a Bluetooth transceiver, and/or a WLAN transceiver. Of course, the second wireless device 21 may be another type of transceiver and/or may be communicate via more than one wireless protocol, for example, either Bluetooth or WLAN.

The remote function device 20 also illustratively includes a third wireless device 22 to wirelessly communicate with a remote control device 30 outside of, or exterior to, the vehicle 34, at Block 43. In this regard, the third wireless device 22 may be considered an "exterior" wireless device in that it communicates with other wireless devices outside of the vehicle 34 (although it is located within the vehicle). In some embodiments, the third wireless device 21 may be a cellular transceiver and/or a satellite transceiver. In other embodiments, the third wireless device 22 may be a short range wireless device, for example, a WLAN or Bluetooth transceiver. Of course, the third wireless device 22 may be another type of device communicating over another protocol, and it may communicate using more than one protocol, as will be appreciated by those skilled in the art.

The remote function device 20 also illustratively includes a controller 23 coupled to the second and third wireless devices 21, 22 to permit communication between the remote control device 30 away from (i.e., exterior to) the vehicle and the vehicle devices 16*a*-16*n* coupled to the vehicle data communications bus 15, at Block 44. More particularly, the controller 23 permits the remote control device 30 to read from the vehicle devices 16*a*-16*n*, and/or for the remote control device to command the vehicle devices. The controller 23 may also be implemented with a microprocessor and a non-transitory computer-readable medium having computer-executable instructions for causing the microprocessor to perform the noted operations herein, for example.

The remote control device 30 may be a cellular telephone (e.g., a smart phone) and may receive a status of a vehicle device 16*a*-16*n*, for example, the door locks. The remote control device 30 may communicate with the remote function device 20 using a cellular communications protocol, for example. Alternatively, the remote control device 30 may include a WLAN transceiver and may communicate with the remote function device 20 using a WLAN protocol. In some embodiments, where, for example, the remote control device 30 is equipped with both cellular and WLAN and/or Bluetooth transceivers, the remote control device may communicate with the remote control function device 20 using the WLAN or Bluetooth transceivers when within a relatively short range to the remote function device, and may communicate using the cellular transceiver when outside the WLAN or Bluetooth range. Of course, when there is relative movement between the remote control device 30 and the remote function device 20, the remote control device may initially communicate with the remote function device via the cellular transceiver and switch to one of the WLAN/Bluetooth transceivers when within range.

In other embodiments, the remote control device 30 may be a remote monitoring station. For example, vehicle devices 16*a*-16*n*, such as door locks, may be wirelessly controlled, for example, when a vehicle operator has locked themselves out of the vehicle 35. A remote monitoring station may communicate with the third wireless device 22 via a cellular or satellite link, for example. Additionally, a remote monitoring station may wirelessly receive a status of vehicle safety devices, for example, crash sensors or airbag deployment sensors. In response, personnel at the remote monitoring station may wirelessly enable or disable certain vehicle devices 16*a*-16*n*, for example, disabling the engine. Remote monitoring stations may also be connected to other communications infrastructure, as will be appreciated by those skilled in the art.

In accordance with another example embodiment, the remote control device 30 may be a FOB and communicate using a WLAN protocol. In other examples, the remote control device 30 may be another type of wireless device, such as a laptop or tablet computer, for example.

The system 10 further illustratively includes one or more wireless security sensors 31 positioned within the vehicle 34 and coupled to the wired vehicle electrical power system 18. In the illustrated example, the wireless security sensor 31 wirelessly communicates within the vehicle 31 with the second wireless transceiver 21 (Block 45) via a short-range communications format, such as those described above (e.g., Bluetooth, WLAN, etc.). By way of example, the wireless security sensor 31 may be a trunk sensor, door sensor, hood sensor, window sensor, etc. As described above, such sensors may take the form of a vibration sensor, sound sensor, pressure sensor, and a radar sensor, for example. However, other suitable sensors may also be used in different embodiments. This advantageously allows different wireless security sensors 31 to be positioned at various locations in the vehicle 34 with the ability to communicate with the remote control device 30 and/or vehicle devices 16*a*-16*n*, yet without having to connect the wireless security sensor to the data bus 15 at locations in the vehicle where such connections would otherwise be difficult or unavailable. Moreover, this allows for additional wireless security sensors 31 to be added over time to increase the overall number of sensors, as well as upgrade or replace the sensors, for enhanced security.

In accordance with one example configuration, one of the vehicle devices 16a-16n may be vehicle alarm. In response to the wireless security sensor 31 detecting an alarm condition (Block 46) when in an armed mode, the controller 23 may activate the vehicle alarm, at Block 47. In some embodiments, the controller 23 may also (or instead) send an alert to the remote control device 30 via the third wireless transceiver 22 responsive to the wireless security sensor 31 detecting the alarm condition, at Block 48. In this regard, it should be noted that communication between the remote control device 30 and the wireless security sensor 31 need not be limited to alarm conditions. That is, at various times the remote control device 30 may read data from the wireless security sensor 31, as well as send one or more commands or instructions to the wireless security sensor, at Block 49, which illustratively concludes the method illustrated in FIG. 4 (Block 50). For example, such instructions may include firmware updates, diagnostic checks, etc. It should be noted that wired security sensors may also be used with the system 10 and coupled to the data bus 15 in some embodiments.

In the example of FIG. 1, the controller 23 is a multi-vehicle compatible controller. The multi-vehicle compatible controller 23 is operable with different vehicles using different data bus protocols and/or different vehicle device bus codes. As will be appreciated by those skilled in the art, the vehicle device bus codes may be unique to each vehicle or vehicle manufacturer. In some embodiments, the different data bus codes and/or data bus protocols may be stored in a memory (not shown) coupled to the multi-vehicle compatible controller 23. The remote function device 20 may be configured to change or set the protocol of the data communications bus 15, the vehicle device bus codes, and the protocol of the second and third wireless devices 21, 22.

For example, the remote function device 20 may request one or more of the vehicle identification number (VIN), the mileage, and fuel level of the vehicle via data communications bus 15 using a first protocol. If a response to the request is received, the correct protocol has been selected. Otherwise, the remote function device 20 may select another protocol and make another request using the newly selected protocol. The process may be repeated until a response is received. The remote function device 20 may also be programmed to selectively enable features of the controller 23, as will be appreciated by those skilled in the art. Further details regarding a multi-vehicle compatible controller are disclosed in the above-noted U.S. Pat. Nos. 5,719,551 and 6,011,460, as well as in U.S. Pub. No. 2014/0277838 to Flick, which is also incorporated herein in its entirety be reference.

To program the multi-vehicle compatible controller 23, a downloading interface (not shown) may be coupled to the controller to permit downloading a configuration of the controller. The downloading interface may be a wired interface for coupling to a programming device, for example, a laptop or tablet computer. Programming or configuration, as noted above, may be performed via downloading from the programming device to the remote function device 20. Of course, the downloading interface may be a wireless interface, for example, so that the multi-vehicle compatible controller 23 may be configured or programmed wirelessly, via the Internet or cellular connection, from a programming device. The multi-vehicle compatible controller 23 may be programmed or configured within the vehicle or may be removed from the vehicle for programming. Further details of programming a multi-vehicle compatible controller 23 may be found in U.S. Pat. No. 8,032,278 to Flick, assigned to the present assignee, and the entire contents of which are herein incorporated by reference. Other or additional programming or configuration techniques may be used, as will be appreciated by those skilled in the art. It should be noted that the controller 23 need not be multi-vehicle compatible in all embodiments, and may be configured for a specific type of vehicle, for example.

In some embodiments, the remote function device 20 may further include a learning interface (not shown) coupled to the multi-vehicle compatible controller 23 to permit learning a configuration of the controller. For example, new or unrecognized configuration parameters, particularly, data bus or communications codes, may be learned as they are communicated, and thereafter stored in memory. Other or additional learning techniques may be used, as will be appreciated by those skilled in the art. The downloading interface and the learning interface may be particularly useful with the multi-vehicle compatible controller 23 for downloading and learning the appropriate vehicle device bus codes and protocols.

In an example embodiment, the multi-vehicle compatible controller 23 may be operable with different vehicles using different wireless communications protocols and/or codes of the first wireless communications device 13. For example, the multi-vehicle compatible controller 23 may be operable with different vehicles using Bluetooth and/or WLAN protocols and/or associated codes of the first wireless communications device 13. As noted above, a downloading interface coupled to the multi-vehicle compatible controller 23 permits downloading a configuration of the controller, and more particularly, the different wireless communications protocols and/or codes of the first wireless device 13. Similarly, a learning interface 26 permits learning a configuration of the controller with respect to the communications codes and/or protocols of the first wireless device 13.

In some example embodiments, the controller 23 may be a remote start controller for performing a remote start function, for example, as described in U.S. Pat. No. 6,812,829, assigned to the present assignee, and the entire contents of which are herein incorporated by reference. For example, the remote control device 30 may cooperate with the controller 23 to wirelessly communicate with a starter vehicle device and/or fuel supply system coupled to the vehicle data bus 15, to thus start the vehicle 35.

In another example embodiment, the controller 23 may be a security controller for performing a security function. For example, the remote control device 30 may cooperate with the security controller 23 to communicate with or activate a vehicle device 16a-16n, for example, a motion sensor, coupled to the vehicle data bus 15. As another example, the security controller 23 may communicate with the door locks coupled to the data communications bus 15 to send a door lock status to the remote control device 30. The security controller 23 may also send a vehicle device status, such as, for example, an alarm condition detected by the wireless security sensor 31 to the remote control device 30.

In still another example embodiment, the controller 23 may be a remote keyless entry controller for performing at least one remote keyless entry function. For example, the controller 23 may permit communication from the remote control device 30 for unlocking the door locks. The remote control device 30 may also cooperate via the controller 23 to lock the doors of the vehicle 34.

In accordance with another example, the controller 23 may be a diagnostic controller for performing at least one diagnostic function. For example, the diagnostic controller 23 may permit communication for determining vehicle fault codes and communicating those codes to the remote control device 30. The remote control device 30 may be a portable computer, laptop or tablet, for example, and may wirelessly receive the vehicle fault codes. Diagnostic codes, for example, device reset codes, may be wirelessly sent from the portable computer 30 to one or more vehicle devices 16a-16n via the diagnostic controller 23.

Figure 2:
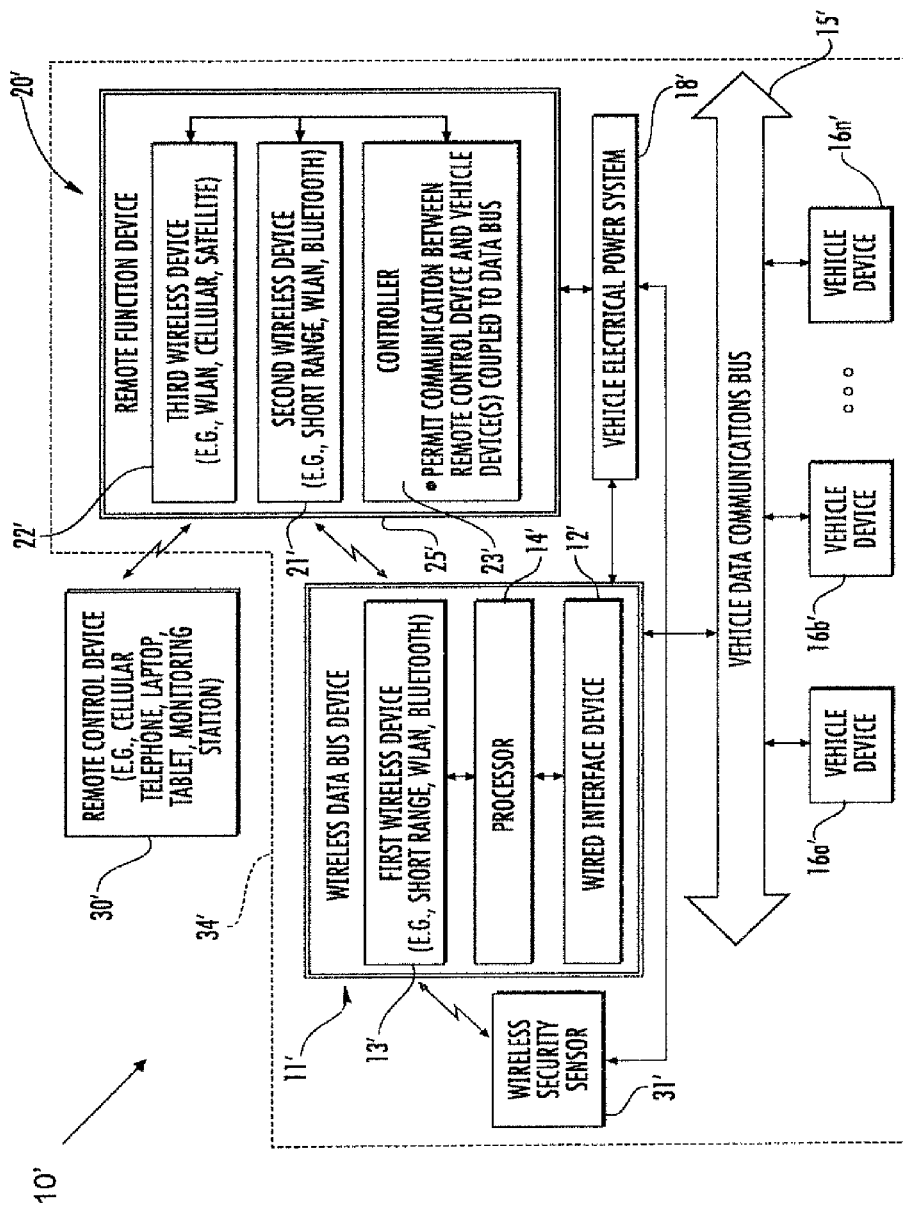
FIG. 2 is a block diagram of a remote function control system in accordance with another example embodiment.
Figure 5:
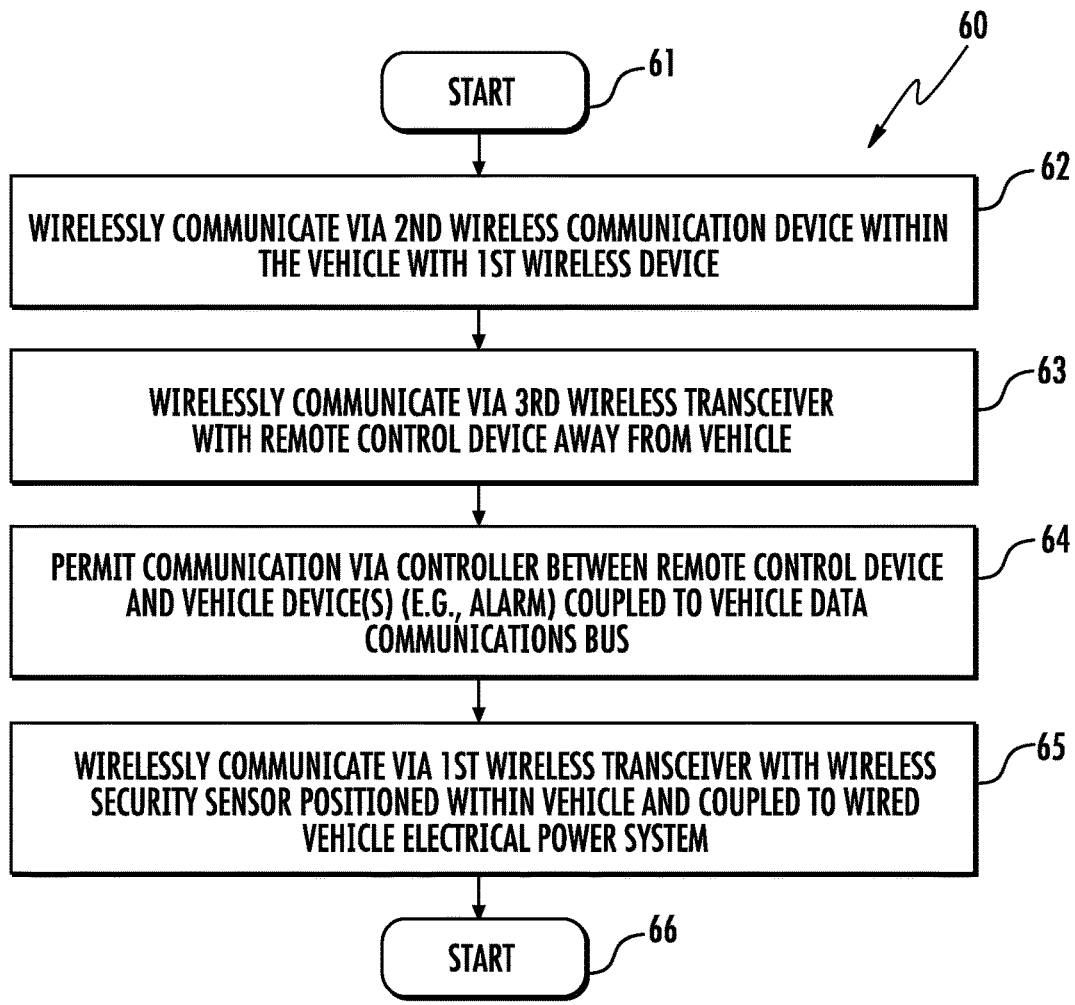
FIG. 5 is a flow diagram illustrating method aspects associated with the system of FIG. 2.

Turning now to FIG. 2 and the flow diagram 60 of FIG. 5, an alternative arrangement of the system 10' and the wireless security sensor 31' is described. As before, beginning at Block 61, the remote function device 20' wirelessly communicates via the second wireless communication device 21' within the vehicle 34' with the first wireless device 13', at Block 62, wirelessly communicates via the third wireless device 22' with the remote control device 30' away from the vehicle (Block 63), and permits communication via the controller 23' between the remote control device and one or more of the vehicle devices 16a-16n, at Block 64. However, in this configuration, the wireless security sensor 31' wirelessly communicates with the first wireless device 13' of the wired data bus device 11', as opposed to the second wireless device 21', at Block 65, which concludes the method illustrated in FIG. 5 (Block 66). The remaining reference numerals 12', 14', 15', 18' and 25' in FIG. 2 indicate components that are respectively similar to those described above with reference numerals 12, 14, 15, 18 and 25, which therefore require no further discussion herein.

Figure 3:
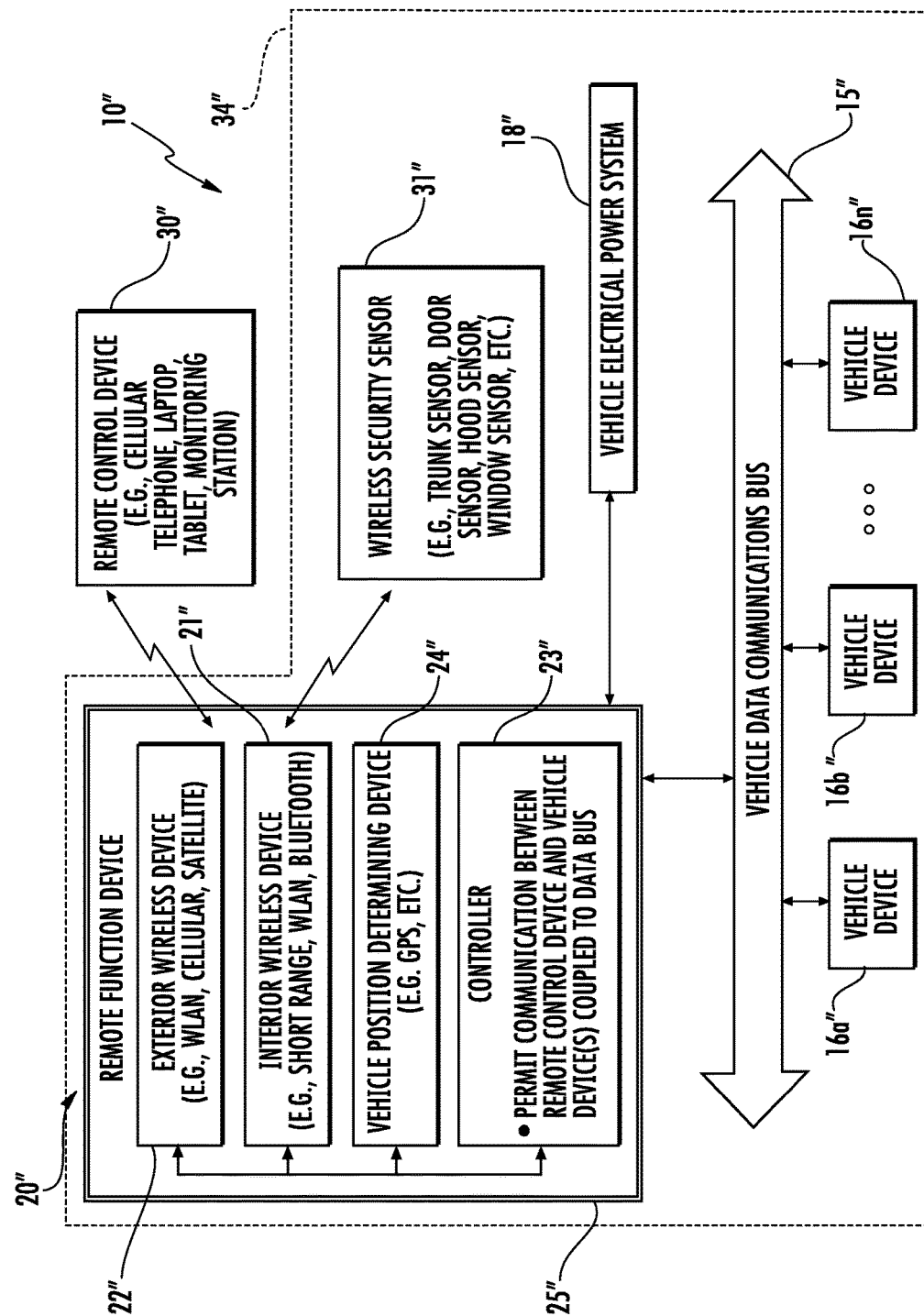
FIG. 3 is a block diagram of a remote function control system in accordance with yet another example embodiment.
Figure 6:
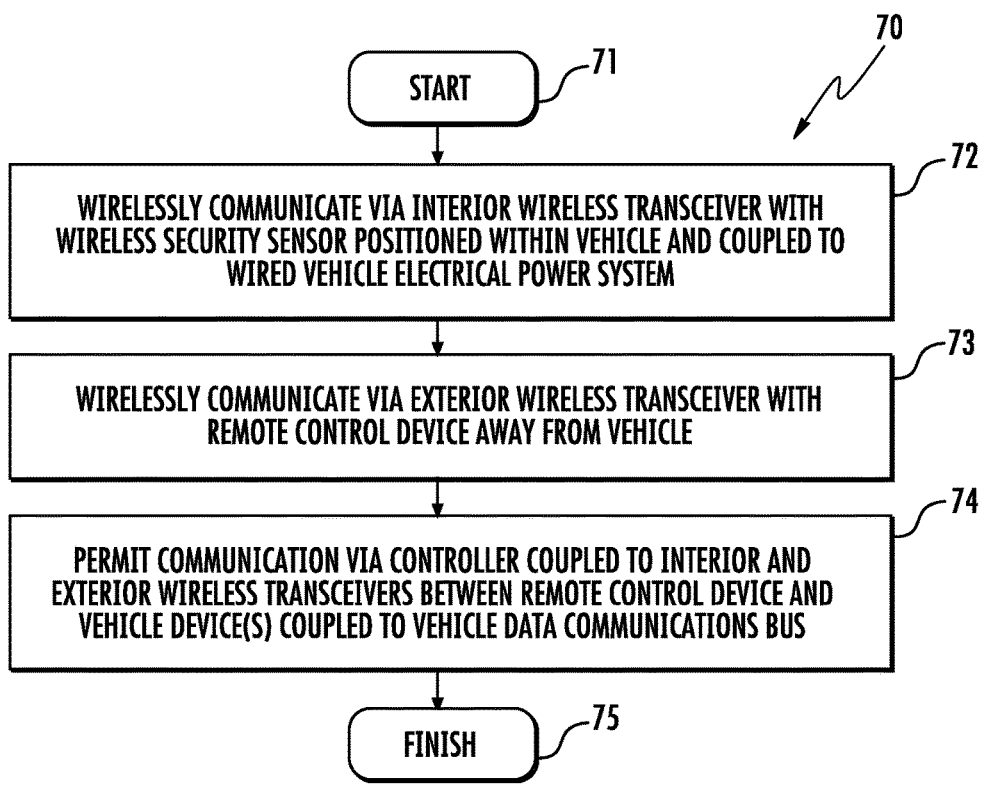
FIG. 6 is a flow diagram illustrating method aspects associated with the system of FIG. 3.

Referring additionally to FIG. 3 and the flow diagram 70 of FIG. 6, beginning at Block 71, in this configuration the remote function device 20" is directly connected to the vehicle data communications bus 15", and thus the wired data bus devices 11, 11' described above are not included. In accordance with one example implementation, the housing 25" may be a portable housing that is removably coupled to the data communications bus 15". For example, in one embodiment the vehicle data communications bus 15" may be an on-board diagnostics (OBD) bus with a connector or port within the passenger compartment of the vehicle, and the portable housing 25" may define a plug to be removably plugged into the OBD port and, optionally, the vehicle electrical power system 18" (in some embodiments the remote function device 20" may be directly powered by the vehicle data bus 15"). However, the remote function device 20" may be used with other types of vehicle data busses as well in different embodiments.

The remote function device 20" wirelessly communicates via an interior wireless device 21" (which is similar to the second wireless devices 21, 21' described above) with the wireless security sensor 31" positioned within the vehicle 34" (Block 72), and wirelessly communicates via an exterior wireless device 22" (which is similar to the third wireless devices 22, 22' described above) with the remote control device 30" away from the vehicle, at Block 73. Moreover, the controller 23" also permits communication between the remote control device 30" and one or more of the vehicle devices 16a"-16n" coupled to the vehicle data communications 15".

In the illustrated example, the remote function device 20" further illustratively includes a vehicle position determining device 24", for example, a global positioning system (GPS) receiver, coupled to the controller 23". The controller 23" may perform a tracking function based upon the vehicle location, for example, which may be used to determine a vehicle condition or status (e.g., stolen, etc.). Vehicle device functions may be controlled by the controller 23" based upon the vehicle position. Further details of a vehicle tracking unit for controlling operable vehicle devices using a data communications bus are disclosed in U.S. Pat. No. 6,924,750, assigned to the present Assignee, and the entire contents of which are herein incorporated by reference.

While controllers 23, 23', and 23" have been described in several examples above, it should be understood that the controller in a given implementation may be more than one type of controller and configured to perform any one or more of the above-noted functions in different embodiments. Additional functions may be performed by the controller 23, 23', or 23" as will be appreciated by those skilled in the art. For example, the controller 23, 23', or 23" may be a climate controller and perform a climate controlling function, such as, changing the cabin temperature and fan speed.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A remote function control system for a vehicle including a data communications bus extending throughout the vehicle and coupled to a plurality of vehicle devices, and a wired vehicle electrical power system, the remote function control system comprising:
   a remote function device coupled to the data communications bus and comprising
      an interior wireless device to wirelessly communicate within the vehicle,
      an exterior wireless device to wirelessly communicate with a remote control device away from the vehicle, and
      a processor coupled to the interior and exterior wireless devices to permit communication between the remote control device and at least one vehicle device coupled to the vehicle data communications bus; and
   a wireless security sensor positioned within the vehicle and coupled to the wired vehicle electrical power system and not electrically connected to the vehicle data communications bus, the wireless security sensor being configured to wirelessly communicate within the vehicle to the interior wireless device.

2. The remote function control system of claim 1 wherein the at least one vehicle device comprises a vehicle alarm; and wherein the processor is configured to activate the vehicle alarm responsive to the wireless security sensor.

3. The remote function control device of claim 1 wherein the remote function device further comprises a satellite positioning receiver coupled to the processor.

4. The remote function control device of claim 1 wherein the remote function device further comprises a portable housing carrying the interior and exterior wireless devices and the processor, and wherein the portable housing is removably coupled to the data communications bus.

5. The remote function control device of claim 1 wherein the processor is configured to send an alert to the remote control device via the exterior wireless device based upon the wireless security sensor.

6. The remote function control system of claim 1 wherein the wireless security sensor comprises at least one of a trunk sensor, door sensor, hood sensor, and a window sensor.

7. The remote function control system of claim 1 wherein the wireless security sensor comprises at least one of a vibration sensor, sound sensor, pressure sensor, and a radar sensor.

8. The remote function control system of claim 1 wherein the remote function device comprises a multi-vehicle compatible remote function device operable with a plurality of different vehicles using respective different bus protocols.

9. The remote function control system of claim 1 wherein the remote function device comprises a multi-vehicle compatible remote function device operable with a plurality of different vehicles using respective different vehicle device bus codes.

10. The remote function control system of claim 1 wherein the remote function device comprises a multi-vehicle compatible remote function device operable with a plurality of different vehicles using respective different wireless communications protocols of the internal wireless device.

11. The remote function control system of claim 1 wherein the remote function device comprises a multi-vehicle compatible remote function device operable with a plurality of different vehicles using respective different wireless communications codes of the internal wireless device.

12. The remote function control system of claim 1 wherein the processor permits communication for the remote control device to read data from the wireless security sensor.

13. The remote function control system of claim 1 wherein the processor permits communication for the remote control device to command the wireless security sensor.

14. A remote function control system for a vehicle including a data communications bus extending throughout the vehicle and coupled to a plurality of vehicle devices, and a wired vehicle electrical power system, the remote function control system comprising:
a remote function device coupled to the data communications bus and comprising
an interior wireless device to wirelessly communicate within the vehicle,
an exterior wireless device to wirelessly communicate with a remote control device away from the vehicle,
a satellite positioning receiver,
a processor coupled to the interior and exterior wireless devices and the satellite positioning receiver, the processor permitting communication between the remote control device and at least one vehicle device coupled to the vehicle data communications bus, and
a portable housing carrying the interior and exterior wireless devices, the satellite positioning receiver and the processor, and wherein the portable housing is removably coupled to the data communications bus; and
a wireless security sensor positioned within the vehicle and coupled to the wired vehicle electrical power system and not electrically connected to the vehicle data communications bus, the wireless security sensor being configured to wirelessly communicate within the vehicle to the interior wireless device.

15. The remote function control system of claim 14 wherein the at least one vehicle device comprises a vehicle alarm; and wherein the processor is configured to activate the vehicle alarm responsive to the wireless security sensor.

16. The remote function control device of claim 14 wherein the processor is configured to send an alert to the remote control device via the exterior wireless device based upon the wireless security sensor.

17. The remote function control system of claim 14 wherein the wireless security sensor comprises at least one of a trunk sensor, door sensor, hood sensor, and a window sensor.

18. The remote function control system of claim 14 wherein the wireless security sensor comprises at least one of a vibration sensor, sound sensor, pressure sensor, and a radar sensor.

19. The remote function control system of claim 14 wherein the processor permits communication for the remote control device to read data from the wireless security sensor.

20. The remote function control system of claim 14 wherein the processor permits communication for the remote control device to command the wireless security sensor.

21. A method of remotely controlling a vehicle function in a vehicle including a data communications bus extending throughout the vehicle and coupled to a plurality of vehicle devices, and a wired vehicle electrical power system, the method comprising:
using a remote function device coupled to the data communications bus to
wirelessly communicate via an interior wireless device with a wireless security sensor positioned within the vehicle and coupled to the wired vehicle electrical power system and not electrically connected to the vehicle data communications bus,
wirelessly communicate via an exterior wireless device with a remote control device away from the vehicle, and
permit communication via a processor coupled to the interior and exterior wireless devices between the remote control device and at least one vehicle device coupled to the vehicle data communications bus.

22. The method of claim 21 wherein the at least one vehicle device comprises a vehicle alarm; and further comprising using the processor to activate the vehicle alarm responsive to the wireless security sensor.

23. The method of claim 21 wherein the remote function device further comprises a satellite positioning receiver coupled to the processor.

24. The method of claim 21 wherein the remote function device further comprises a portable housing carrying the interior and exterior wireless devices and the processor, and wherein the portable housing is removably coupled to the data communications bus.

25. The method of claim 21 further comprising using the processor to send an alert to the remote control device via the exterior wireless device based upon the wireless security sensor.

26. The method of claim 21 wherein the wireless security sensor comprises at least one of a trunk sensor, door sensor, hood sensor, and a window sensor.

27. The method of claim 21 wherein the wireless security sensor comprises at least one of a vibration sensor, sound sensor, pressure sensor, and a radar sensor.

* * * * *